(12) United States Patent
Singh et al.

(10) Patent No.: US 11,514,506 B2
(45) Date of Patent: Nov. 29, 2022

(54) LISTING CONVERSION ESTIMATION AND OPTIMIZATION

(71) Applicant: eBay Inc., San Jose, CA (US)

(72) Inventors: Vikas Singh, San Jose, CA (US);
Bhumika Gupta, Sunnyvale, CA (US);
SureshKumar Karuppuchamy, San Jose, CA (US); Srividya Balasubramanian, Fremont, CA (US)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 16/782,445

(22) Filed: Feb. 5, 2020

(65) Prior Publication Data
US 2021/0241361 A1 Aug. 5, 2021

(51) Int. Cl.
*G06Q 30/00* (2012.01)
*G06Q 30/06* (2012.01)
*G06N 20/00* (2019.01)

(52) U.S. Cl.
CPC ........ *G06Q 30/0643* (2013.01); *G06N 20/00* (2019.01); *G06Q 30/0633* (2013.01)

(58) Field of Classification Search
None
See application file for complete search history.

(56) References Cited

U.S. PATENT DOCUMENTS

| | | | |
|---|---|---|---|
| 8,447,645 B2 | 5/2013 | Rothman | |
| 9,727,616 B2 | 8/2017 | Wu et al. | |
| 10,438,264 B1 * | 10/2019 | Viswanathan | G06F 16/252 |
| 2010/0169336 A1 * | 7/2010 | Eckhoff-Hornback | G06Q 20/203 707/758 |
| 2011/0004509 A1 * | 1/2011 | Wu | G06Q 10/06375 705/7.37 |
| 2017/0308846 A1 * | 10/2017 | de Mars | G06Q 10/067 |
| 2019/0287125 A1 * | 9/2019 | Kumar | G06Q 20/20 |
| 2019/0325490 A1 * | 10/2019 | Acriche | G06Q 30/0641 |
| 2020/0151743 A1 * | 5/2020 | Acriche | G06Q 30/0202 |
| 2020/0167811 A1 * | 5/2020 | Aggarwal | G06Q 30/0639 |
| 2021/0133862 A1 * | 5/2021 | Singh | G06Q 30/0605 |

OTHER PUBLICATIONS

Anthony Brebion "The Definitive Guide to Creating Perfect Product Listing Pages in 2020" Jun. 5, 2018. Retrieved from https://www.abtasty.com/blog/product-listing-pages-optimization/ (Year: 2018).*

* cited by examiner

*Primary Examiner* — Naeem U Haq
(74) *Attorney, Agent, or Firm* — Schwegman Lundberg & Woessner, P.A.

(57) ABSTRACT

Disclosed are systems, methods, and non-transitory computer-readable media for listing conversion estimation and optimization. A listing conversion estimation and optimization system receives a set of listing data for generating a listing of an item for sale on an online marketplace and determines, based on the set of listing data, a likelihood value indicating the likelihood that the listing will result in a sale within a given time period. The listing conversion estimation and optimization system causes presentation of a graphical indicator representing the likelihood value on the display of the listing user's client device.

17 Claims, 15 Drawing Sheets

| Field | Value | Ref |
|---|---|---|
| Title | USED SNORKEL | 402 |
| Price | $50 | 404 |
| Images | IMAGE 1 | 406 |
| Item Description | SADFSADF SADFLSADJFLA SDF ASDF SDF SADF S DF SADF S ADF SADF S AFD | 408 |
| Free Shipping | YES | 410 |
| Free Returns | YES | 412 |
| Aspects | | 414 |

422: Tip: Add Aspects, images and a longer description to increase your likelihood of selling this item!

416: (gauge)

418: 62%

420: Post Listing

| | |
|---|---|
| Title | USED SNORKEL | 402
| Price | $40 | 404
| Images | IMAGE 1; IMAGE 2; IMAGE 3 | 406
| Item Description | SADFSADF SADFLSADJFLA SDF ASDF SDF SADF S DF SADF S ADF SADF S AFD ASDF ASDF ASDF SA DFSA DF ASSADF FASD AS DFSA DF ASDF  FSA D DF SA DF ASDF S ADF SAD F SD F FAS DF ASD F SDF F AS DF ASDF FF | 408
| Free Shipping | YES | 410
| Free Returns | YES | 412
| Aspects | Full Face, Purge Valve | 414

422 — This item has a 95% chance of selling in the next week and a 98% chance of selling in the next two weeks!!!!!

416

418 — 95%

420 — Post Listing

*FIG. 4H*

LISTING CONVERSION ESTIMATION AND OPTIMIZATION

TECHNICAL FIELD

An embodiment of the present subject matter relates generally to generating listings and, more specifically, to listing conversion estimation and optimization.

BACKGROUND

Online marketplace services allow users to buy and sell items. For example, these services enable users to post listings for each item that the user wishes to sell, as well as view listings posted by other users. While these types of services make selling and buying items easy, they provide challenges as well. Sellers do not directly interact with customers in an online setting and therefore may be unaware of the items for which there is a current demand. This may make some users hesitant to list items for sale because they do not want to waste time creating listing for items that are unlikely to sell. Further, sellers may be unsure of what information included in the listing will increase the likelihood that the listed items will sell. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 4A-4H show examples of a listing interface providing listing conversion estimation and optimization, according to some example embodiments.

DETAILED DESCRIPTION

Figure 1:
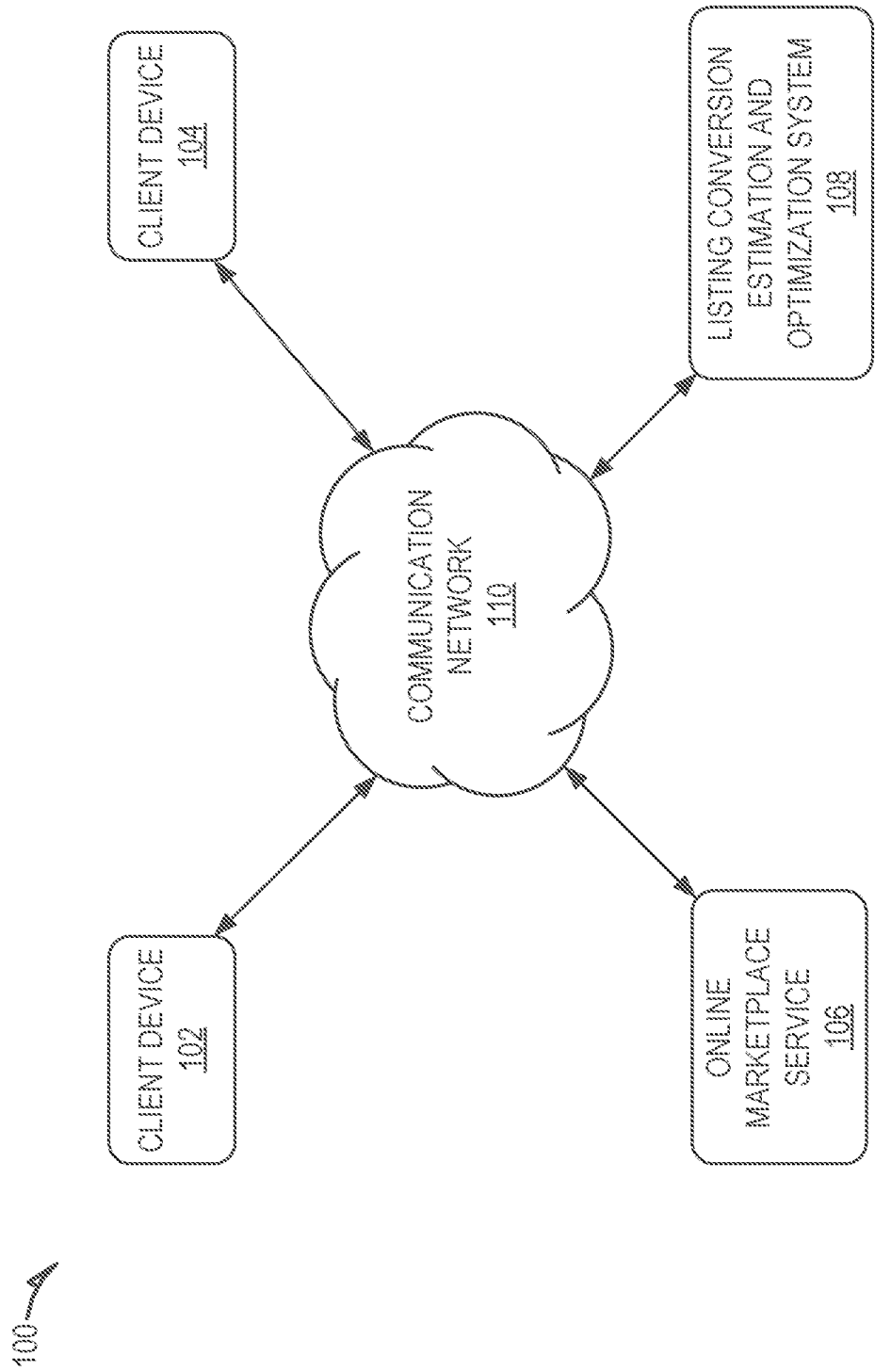
FIG. 1 shows a system providing listing conversion estimation and optimization, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for listing conversion estimation and optimization. An online marketplace service allows users to buy and sell items online. For example, the online marketplace service allows users to post a listing to an online marketplace that lists an item for sale. Other users may view the posted listing and purchase the listed item if so desired. As explained earlier, some sellers may be dissuaded from posting a listing if/when the seller is unsure how likely the listing is to result in a conversion, such as a sale of the listed item. Further some sellers may be uncertain regarding how they can increase the likelihood that a listed item will result in a conversion.

To alleviate these issues, an online marketplace service may utilize the functionality of a listing conversion estimation and optimization system that determines the likelihood that a listing will result in a conversion and provides recommended modifications to improve the likelihood that the listing will result in a conversion (e.g., sale). The listing conversion estimation and optimization system may receive listing data entered by a seller generating a listing and use the listing data to determine a likelihood value indicating a likelihood that the listing will result in a conversion during a specified time period. The listing conversion estimation and optimization system may generate a graphical indicator, such as graphical gauge, that represents the likelihood value, and cause the graphical indicator to be presented to the seller generating the listing. The seller can use the graphical indicator to quickly and easily determine how likely the listing is to result in a conversion.

The listing conversion estimation and optimization system may update the likelihood value and the graphical indicator in real-time or near real-time during the listing creation process. For example, the listing conversion estimation and optimization system may receive updated listing data as the seller adds, modifies, and or deletes listing data. Examples of updated listing data may include additions and/or modifications made to the description, title, price, images, aspects, etc., of the listing. The listing conversion estimation and optimization system uses the received updated listing data to determine an updated likelihood value indicating the likelihood that the listing will result in a conversion based on the modifications made to the listing. The listing conversion estimation and optimization system generates an updated graphical indicator representing the updated likelihood value, which is then presented to the seller. Accordingly, the seller is provided with a continually updated representation of the likelihood that the listing will result in a conversion during the listing creation process as the user add, modifies, and/or removes listing data.

The listing conversion estimation and optimization system may also provide the seller with recommended modifications to increase the likelihood of the listing resulting in a conversion. For example, the listing conversion estimation and optimization system may determine the impact that a set of modifications may have to the likelihood of the listing resulting in a conversion, such as adding additional data to the listing, modifying existing data included in the listing and/or removing existing data included in the listing. The listing conversion estimation and optimization system may then provide the seller with the recommended modifications that are estimated to have the greatest impact on the likelihood that the listing will result in a conversion. The recommended modifications may be presented to the seller along with an indication of the estimated impact that performing the recommended modification will have on the likelihood that the listing will result in a conversion. For example, the recommended modification may notify the seller that performing the recommended modification may increase the likelihood of the listing resulting in a conversion by a specified amount and/or will result in an updated likelihood value of a specified amount. Accordingly, the seller can easily determine what modifications will improve the listing as well as the impact that performing each modification will have on the likelihood that the listing will result in a conversion.

FIG. 1 shows a system 100 providing listing conversion estimation and optimization, according to some example embodiments. As shown, multiple devices (i.e., client device 102, client device 104, online marketplace service 106, and listing conversion estimation and optimization 108) are connected to a communication network 110 and configured to communicate with each other through use of the communication network 110. The communication network 110 is any type of network, including a local area network (LAN), such as an intranet, a wide area network (WAN), such as the internet, or any combination thereof. Further, the communication network 110 may be a public network, a private network, or a combination thereof. The communication network 110 is implemented using any number of communication links associated with one or more service providers, including one or more wired communication links, one or more wireless communication links, or any combination thereof. Additionally, the communication network 110 is configured to support the transmission of data formatted using any number of protocols.

Multiple computing devices can be connected to the communication network 110. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 800 shown in FIG. 8.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

In the system 100, users interact with the online marketplace service 106 to utilize the services provided by the online marketplace service 106. The online marketplace service 106 provides an online marketplace in which users may post items for sale and purchase items posted for sale by other users. For example, the online marketplace service 160 may include items being auctioned for sale and/or items listed for sale at a set price. Users communicate with and utilize the functionality of the online marketplace service 106 by using the client devices 102 and 104 that are connected to the communication network 110 by direct and/or indirect communication.

Although the shown system 100 includes only two client devices 102, 104, this is only for ease of explanation and is not meant to be limiting. One skilled in the art would appreciate that the system 100 can include any number of client devices 102, 104. Further, the online marketplace service 106 may concurrently accept connections from and interact with any number of client devices 102, 104. The online marketplace service 106 supports connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems, and so forth.

A user interacts with the online marketplace service 106 via a client-side application installed on the client devices 102 and 104. In some embodiments, the client-side application includes a component specific to the online marketplace service 106. For example, the component may be a stand-alone application, one or more application plug-ins, and/or a browser extension. However, the users may also interact with the online marketplace service 106 via a third-party application, such as a web browser, that resides on the client devices 102 and 104 and is configured to communicate with the online marketplace service 106. In either case, the client-side application presents a user interface (UI) for the user to interact with the online marketplace service 106. For example, the user interacts with the online marketplace service 106 via a client-side application integrated with the file system or via a webpage displayed using a web browser application.

The online marketplace service 106 is one or more computing devices configured to facilitate an online marketplace (e.g., EBAY, AMAZON, etc.) in which users may post items for sale and purchase items posted for sale by other users. For example, the online marketplace service 106 provides a user interface that enables users to view listings posted to the online marketplace service 106. Each listing provides details for an item or items listed for sale. For example, the listing may include an item description, images, sale price, current bid price, auction time remaining, shipping options, aspects, etc.

The online marketplace service 106 may further provide functionality that enables a user to purchase and/or bid on an item listed for sale. For example, the online marketplace service 106 may provide user interface elements (e.g., button, text fields, etc.) that a user may use to select to purchase an item, place a bid, etc., as well as provide their financial (e.g., credit card number, bank account number) and personal information (e.g., shipping address, billing address, etc.) to complete the purchase.

To list an item for sale on the online marketplace, a user creates a user account with the online marketplace service 106. The user account may include the user's personal information (e.g., name, address, email address, phone number, etc.) and financial information (e.g., credit card information, bank account information, etc.). Once the user has created a user account, the user may then use their user account to utilize the functionality of the online marketplace service 106, including listing an item for sale on the online marketplace. The online marketplace service 106 provides users with a listing interface that enables a user to create a new listing as well as provide data for the listing. For example, the listing interface may include data fields that prompt the user to provide specified information for the listing, such as the sale price, item description, listing title, images, shipping cost, return policy, aspects, etc. The listing interface may also include user interface elements, such as buttons, that enable the user to submit and/or post a completed listing. That is, the user may post the listing after the user has filled in the data fields and provided images included in the listing interface.

To aid users with the listing process, the online marketplace service 106 provides for listing conversion estimation and optimization. For example, the online marketplace service 106 may utilize the functionality of a listing conversion estimation and optimization system 108. Although the listing conversion estimation and optimization system 108 and the online marketplace 106 are shown as separate entities, this is just for ease of explanation and is not meant to be limiting. In some embodiments, the listing conversion estimation and optimization system 108 is incorporated as part of the online marketplace service 106.

The listing conversion estimation and optimization system 108 determines the likelihood that a listing will result in a conversion and provides recommended modifications to improve the likelihood that the listing will result in a conversion. A conversion may be any type of desired action, such as a sale of the listed item, a selection to follow the listing, a specified number of item views, specified number of item likes, etc.

The listing conversion estimation and optimization system 108 may receive listing data entered by a seller generating a listing and use the listing data to determine a likelihood value indicating a likelihood that the listing will result in a conversion during a specified time period. The listing data may include any type of data provided to describe the listed items and/or conditions associated with purchase of the listed item. For example, the listing data may include a listing title, item sale price, item description, images, shipping conditions and/or cost, return policy, aspects, etc.

The listing conversion estimation and optimization system 108 may receive the listing data from the online marketplace service 106 as a user is generating a new listing to be posted to the online marketplace. That is, the listing conversion estimation and optimization system 108 may receive the listing data as the user is using the listing interface to enter text, upload images, select configurations, aspects, etc.

The listing conversion estimation and optimization system 108 generates the likelihood value using one or more machine learning models trained based on historical listing data. The historical listing data includes data associated with previous listings posted to the online marketplace. For example, the historical listing data includes the listing data provided by sellers for listing that were previously posted to the online marketplace, such as the listing title, images, item description, price, aspects, etc. The historical listing data also include performance data describing interactions taken in relation to the listing while the listing was actively posted to the online marketplace. For example, the performance data may include data indicating whether the listing resulted in a conversion (e.g., the listing item was sold), a number of days the listing was active prior to conversion, the number of times the listing was viewed, the number of likes the listing received, etc. The historical listing data may also include data describing active inventory of the online marketplace during the time when the listing was active, such as data describing the number of other active listing for the same item, the number of searches executed for the listed item, etc.

Once trained, the machine learning model(s) may output the likelihood value for a listing based on a set of specified input data, such as the listing data provided for the listing, the number of other active listings for the same item, the number of searches for the item, etc. Accordingly, the listing conversion estimation and optimization system 108 gathers the input data and uses it as input into the generated machine learning model(s), which in turn outputs the likelihood value for the listing.

The likelihood value is a singular value indicating the likelihood that a listing will result in a conversion within a given time period (e.g., 1 day, 1 week, 2 weeks, etc.). In some embodiments, the likelihood value is determined from multiple sub-values. For example, the likelihood value may be determined from a sub-value indicating the likelihood that the listing will result in a conversion based on the listing data, as well a sub-value indicating the likelihood that the item will result in a conversion based on the other active listings for the same item and/or the number of searches for the listing (e.g., inventory and/or demand for the item).

The listing conversion estimation and optimization system 108 may generate a graphical indicator, such as graphical gauge or dial, that represents the likelihood value. The graphical indicator may provide an easy to read visual representation of the likelihood value. For example, the graphical indicator may be a graphical dial that shows a needle positioned at a point that represents the likelihood value. The graphical indicator may also present a color or other indicator to represent the likelihood value or a range in which the likelihood value is within. For example, the graphical indicator may present colors, such as green, yellow and red, to indicate the range in which the likelihood value falls. Accordingly, a user may view the needle to determine the likelihood value itself and the presented color to further understand the meaning of the likelihood value, such as the likelihood value representing a relatively high or low likelihood or the listing resulting in a conversion.

The listing conversion estimation and optimization system 108 causes the graphical indicator to be presented to the seller generating the listing. For example, the graphical indicator may be presented within the listing interface being used by the user to generate the listing. The seller can therefore use the presented graphical indicator to quickly and easily determine how likely the listing is to result in a conversion.

The listing conversion estimation and optimization system 108 may update the likelihood value and the graphical indicator in real-time or near real-time. For example, the listing conversion estimation and optimization system 108 may receive updated listing data as the seller continues to generate the new listing by adding, modifying, and/or removing listing data. Examples of updated listing data may include additions and/or modifications made to the description, title, price, images, aspects, shipping conditions, etc., of the listing. The listing conversion estimation and optimization system 108 uses the received updated listing data to determine an updated likelihood value based on the updates to the listing. The listing conversion estimation and optimization system 108 updates the graphical indicator presented to the seller based on the updated likelihood value. Accordingly, the seller is provided with a continually updated representation of the likelihood that the listing will result in a conversion as the seller modifies the listing.

The listing conversion estimation and optimization system 108 may also provide the seller with recommended modifications to increase the likelihood of the listing resulting in a conversion. For example, the listing conversion estimation and optimization system 108 may determine the impact that a set of modifications may have to the likelihood of the listing resulting in a conversion, such as adding additional data to the listing, modifying existing data included in the listing and/or removing existing data included in the listing. The listing conversion estimation and optimization system 108 may then provide the seller with the recommended modifications that are estimated to have the greatest impact on the likelihood that the listing will result in a conversion. For example, the recommended modifications may be presented within to the user within the listing interface.

The recommended modifications may be presented to the seller along with an indication of the estimated impact that performing the recommended modification will have on the likelihood that the listing will result in a conversion. For example, the recommended modification may notify the seller that performing the recommended modification may increase the likelihood of the listing resulting in a conversion by a specified amount and/or will result in an updated likelihood value of a specified amount. Accordingly, the seller can easily determine what modifications will improve the listing as well as the impact that performing each modification will have on the likelihood that the listing will result in a conversion.

Figure 2:
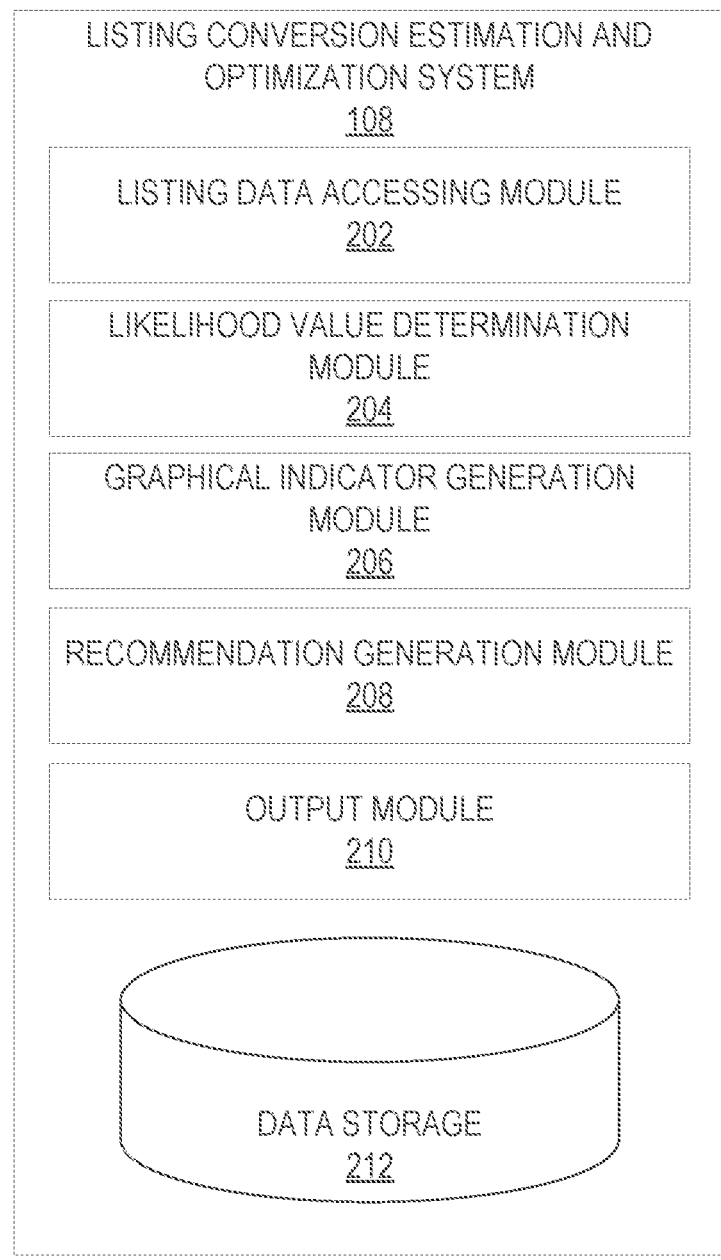
FIG. 2 is a block diagram of a listing conversion estimation and optimization system, according to some example embodiments.

FIG. 2 is a block diagram of the listing conversion estimation and optimization system 108, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the geographic recommendation platform 108 to facilitate additional functionality that is not specifically described herein. Furthermore, the various functional modules depicted in FIG. 2 may reside on a single computing device or may be distributed across several computing devices in various arrangements such as those used in cloud-based architectures. For example, the various functional modules and components may be distributed amongst computing devices that facilitate both the listing conversion estimation and optimization system 108 and the online marketplace service 106.

As shown, the listing conversion estimation and optimization system 108 includes, a listing data accessing module 202, a likelihood value determination module 204, a graphical indicator generation module 206, a recommendation generation module 208, an output module 210, and a data storage 212.

The listing data accessing module 202 accesses listing data provided for a new listing. For example, a user may use the listing interface provided by the online marketplace service 106 to enter text and/or upload images to generate a new listing and the listing data accessing module 202 may access the entered listing data. This may be performed as the user enters the listing data and/or at set intervals.

The listing data accessing module 202 may receive the listing data from the online marketplace service 106 as the user enters the text into the data fields, selects configurations, uploads images, etc. Alternatively, the listing data accessing module 202 may access the listing data from a database, such as a database of the online marketplace service 106 and/or the data storage 212. In any case, the listing data accessing module 202 may directly provide the listing data to the other modules of the listing conversion estimation and optimization system 108 and/or store the listing data in the data storage 212 where it may be accessible by the other modules of the listing conversion estimation and optimization system 108.

The likelihood value determination module 204 uses the gathered listing data to generate a likelihood value indicating an estimated likelihood that the new listing will result in a conversion. A conversion may be any desired or specified result, such as a sale of the listed item, sharing of the listing, viewing of the listing by a predetermined number of users, etc. The likelihood value determination module 204 determines the likelihood value using a set of one or machine learning models that have been trained from historical listing data. The historical listing data includes data associated with previous listings posted to the online marketplace. For example, the historical listing data includes listing data included in the previous listings, such as the listing titles, listing description, item images, price, delivery options (e.g., free delivery, paid delivery, etc.), return options (e.g., free returns, paid returns, etc.), aspects (e.g., structured name values selected to describe the item), etc. The historical listing data may also include performance data describing interactions with the listing, such as whether the listing resulted in a conversion (e.g., the listing item was sold), a number of days the listing was active prior to conversion, the number of times the listing was viewed, the number of unique users that viewed the listing, the number of likes the listing received, etc. The historical listing data may further include historical demand and/or supply data associated with the previously listings, such as the number of other active listing that were concurrently posted for the same item, the number of user searches conducted for the item while the listing was active, etc.

The likelihood value determination module 204 may use any type or combination of types of machine learning models to calculate the likelihood value for the new listing. For example, the likelihood value determination module 204 may user neural networks, linear regression, classification models, etc. The resulting set of machine learning models outputs the likelihood value based on a set of input data. Accordingly, the likelihood value determination module 204 gathers the input data and provides it as input into the machine learning model(s) to generate the likelihood value. For example, the input data may include the listing data for the new listing and current demand and/or supply data, such as the number of other active listings for the item, the price associated with the other active listings, the number of searches for the item, etc.

The resulting likelihood value is a singular value indicating the likelihood that a listing will result in a conversion within a given time period (e.g., 1 day, 1 week, 2 weeks, etc.). In some embodiments, the likelihood value is determined from multiple sub-values. For example, the likelihood value may be determined from a sub-value calculated based on the listing data alone, as well another sub-value calculated based on the demand and/or supply data alone. These sub-values may each represent the likelihood that the listing will result in a conversion based on the given input used to calculate the respective sub-value. For example, a sub-value determined based on the listing data may indicate the likelihood that the listing will result in a conversion based solely on the listing data. As another example, a sub-value determined based on the demand and/or supply data may indicate the likelihood that the listing will result in a conversion based solely on the current demand and/or supply of the item. The likelihood value determination module 204 may then determine the final likelihood value based on each of the sub-values, such as by calculating an average, applying various weights, using the sub-values as input into another machine learning model trained, etc.

These are just some examples of how the likelihood value determination module 204 may calculate the likelihood value are not meant to be limiting. The likelihood value determination module 204 may calculate the likelihood value using any of a variety of techniques, methods, machine learning models and/or algorithms and this disclosure anticipates all such embodiments.

As explained earlier, the likelihood value determination module 204 may continue to update the likelihood value as updated listing data is entered by the user generating the new listing. That is, the likelihood value determination module 204 may repeat the above described process with updated listing data, demand data and/or supply data at specified time intervals and/or as the user modifies the listing. The functioning of the likelihood value determination module 204 is discussed in greater detail below in relation to FIG. 3.

The graphical indicator generation module 206 generates a graphical indicator representing the likelihood value. The graphical indicator is a graphical representation of the likelihood value, such as graphical dial or gauge that indicates the likelihood that the listing will result in a conversion. The graphical indicator provides a representation of the likelihood value that is easy and quick to read by the user. That is, the graphical indicator graphically represents to the user the likelihood that the listing will result in a conversion. To accomplish this, the graphical indicator may include a dial or gauge representing the likelihood value, along with different colors, icons, or other indicators to graphically represent the likelihood that the listing will result in a conversion. A needle of the dial or gauge may be positioned to indicate the likelihood value. Further, the graphical indicator may use a color such as green to indicate that the listing has a high likelihood of resulting in a conversion and a color such as red to indicate that the listing has a low likelihood of resulting in a conversion, or vice versa. As another example, the graphical indicator may include icons or animations, such flames, to indicate that listing has a high likelihood of resulting in a conversion.

These are just a few examples of the types of graphical indicators that may be generated by the graphical indicator generation module 206 to represent the likelihood value and are not meant to be limiting. The graphical indicator generation module 206 may generate any of variety of graphical representations of a value, such as graph, chart, dial, gauge, heat map, etc., and this disclosure anticipates all such embodiments. For example, in some embodiments, the graphical indicator may be represent the likelihood value over multiple time periods. That is, the graphical indicator may represent multiple likelihood values that are each representative of the likelihood that a listing will result in a conversion in different time period. For example, the graphical indicator may represent one likelihood value that the listing will result in a conversion within one week, a second likelihood value that the listing will result in a conversion within two weeks, and a third likelihood value that the listing will result in a conversion within three weeks. The graphical indicator may represent these multiple likelihood values within a two-dimensional chart where one axis represents the likelihood value and the other axis represents time.

The recommendation generation module 208 generates recommend modifications for a listing to increase the likelihood that the listing will result in a conversion. A recommended modification may be a recommended change to the listing data of the listing, such as by adding additional listing data, removing listing data, and/or modifying listing data. For example, a recommended modification may be to increase the length of the item description, reduce the sale price, offer free shipping and/or free returns, upload more images, replace existing images with higher quality images, select aspects, etc.

The recommendation generation module 208 may generate the recommended modifications using machine learning models. For example, the machine learning models used to generate the likelihood score may also output data indicating the impact, either negative or positive, of the various model features on the likelihood score. A machine learning model may generate the likelihood score based on a variety of model features, such as item description length, price, image quality, aspects, etc. The machine learning model may provide data indicating the impact of each feature on the resulting likelihood value, which the recommendation generation module 208 may use to determine recommended modifications to the listing. The recommendation generation module 208 may identify the model features that had the greatest negative impact on the likelihood value and generate recommended modifications to improve those specified features. For example, given an output that the model feature for description length impacted the likelihood value negatively, the recommendation generation module 208 may generate a recommended modification to increate the item description length. As another example, given an output that the model feature for image quality impacted the likelihood value negatively, the recommendation generation module 208 may generate a recommended modification to replace the images with higher quality images. As another example, given an output that the model feature for price impacted the likelihood value negatively, the recommendation generation module 208 may generate a recommended modification to reduce the listing price.

The recommendation generation module 208 may generate recommended modifications based on the model features that negatively impacted the likelihood value the greatest. The recommendation generation module 208 may also calculate an estimated impact of performing the recommended modification, which can be included in the recommended modification. For example, the estimated impact may indicate an estimated increase to the likelihood value and/or an updated likelihood value resulting from performing the recommended modification.

The output module 210 causes presentation of the graphical indicators and recommended modifications to a seller that is generating the new listing. For example, the output module 210 provides data to the online service 106 and/or the client device 102 to cause the graphical indicator and recommended modification to be presented to the seller. The graphical indicator and recommended modification may be presented within the listing interface being used by the seller to generate the new listing.

Figure 3:
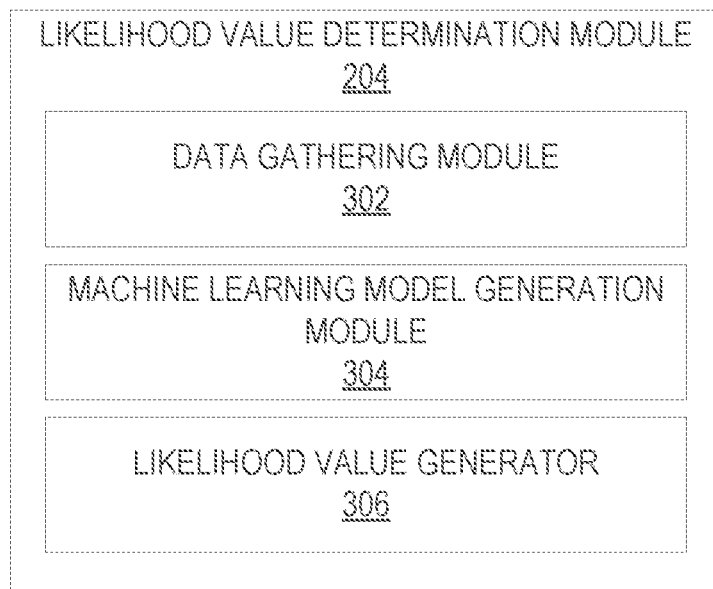
FIG. 3 is a block diagram of a likelihood value determination module, according to some example embodiments.

FIG. 3 is a block diagram of a likelihood value determination module 204, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the likelihood value determination module 204 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the likelihood value determination module 204 includes a data gathering module 302, a machine learning model generation module 304, and a likelihood value generator 306.

The data gathering module 302 gathers data used to generate (e.g., train) the set of machine learning models that output the likelihood value, as well as gather data used as input into the generated set of machine learning models to generate a likelihood value. For example, the data gathering module 302 gathers historical listing data, which is used to train the machine learning models. The historical listing data includes data associated with previous listings posted to the online marketplace. For example, the historical listing data includes listing data included in the previous listings, such as the listing titles, listing description, item images, price, delivery options (e.g., free delivery, paid delivery, etc.), return options (e.g., free returns, paid returns, etc.), aspects, etc. The historical listing data may also include performance data describing interactions with the listing, such as whether the listing resulted in a conversion (e.g., the listing item was sold), a number of days the listing was active prior to conversion, the number of times the listing was viewed, the number of unique users that viewed the listing, the number of likes the listing received, etc. The historical listing data may further include historical demand and/or supply data associated with the previously listings, such as the number of other active listing that were concurrently posted for the same item, the number of user searches conducted for the item while the listing was active, etc.

The data gathering module 302 may access the historical listing data from the online service 106 and/or the data storage 212. For example, the data gathering module 302 may communicate with the online service 106 to request the historical listing data. Alternatively, the online service 106 may automatically transmit the historical listing data to the listing conversion estimation and optimization system 108 at regular intervals. In embodiments in which the listing conversion estimation and optimization system 108 is integrated into the online service 106, the historical listing data may be stored in the data storage 212. Accordingly, the data gathering module 302 may access the historical listing data from the data storage 212.

The data gathering module 302 also gathers current listing data used to generate a likelihood value for a listing. For example, the current listing data may include listing data being entered by a user while the user is in the process of generating a new listing. The current listing data may also include current supply and/or demand data, such as a number of active listings for a same or similar item, a number of search requests for the same or similar item, listing data for the active listings for the same or similar item, etc. The data gathering module 302 may similarly gather the current listing data from online service 106 and/or data storage 212. The data gathering module 302 may provide the gathered data to the other modules of the likelihood value determination module 204 and/or store the gathered data in the data storage 212, where it may be accessible to the other modules.

The machine learning model generation module 304 generates a set of machine learning models based on the historical listing data. The trained set of machine learning models output a likelihood value based on a set of input data. The likelihood value indicates an estimated likelihood that a listing will result in a conversion within a given time period, such as within one week, two weeks, one month, etc.

The machine learning model generation module 304 may generate any of a variety of types of machine learning models and or combination of models. For example, the machine learning model generation module 304 may generate separate machine learning models based on different subsets of the historical listing data. Each of these machine learning models may output a sub-value based on a different set of input data. For example, a machine learning model trained based on just the listing data includes in the historical listings may output a sub-value that indicates the likelihood that a listing will result in a conversion based solely on the listing data included in the new listing. As another example, a machine learning model trained based on just the supply and/or demand for similar items may output a sub-value that indicates the likelihood that a listing will result in a conversion based solely on the current supply and/or demand for the item.

The machine learning model generation module 304 may train another machine learning model that outputs a final likelihood value base on multiple sub-values. For example, the machine learning model would receive as input multiple sub-values representing the likelihood of the listing resulting in a conversion based on some subset of data, such as the listing data, demand data or supply data, and output a final likelihood value indicating the overall likelihood that the listing will result in a conversion.

The likelihood value generator 306 uses the generated set of machine learning models to generate the likelihood value for a listing. For example, the likelihood value generator 306 uses the data gathered by the data gathering module 302 as input into the set of machine learning models, which output the likelihood value for the listing.

Figure 4A:
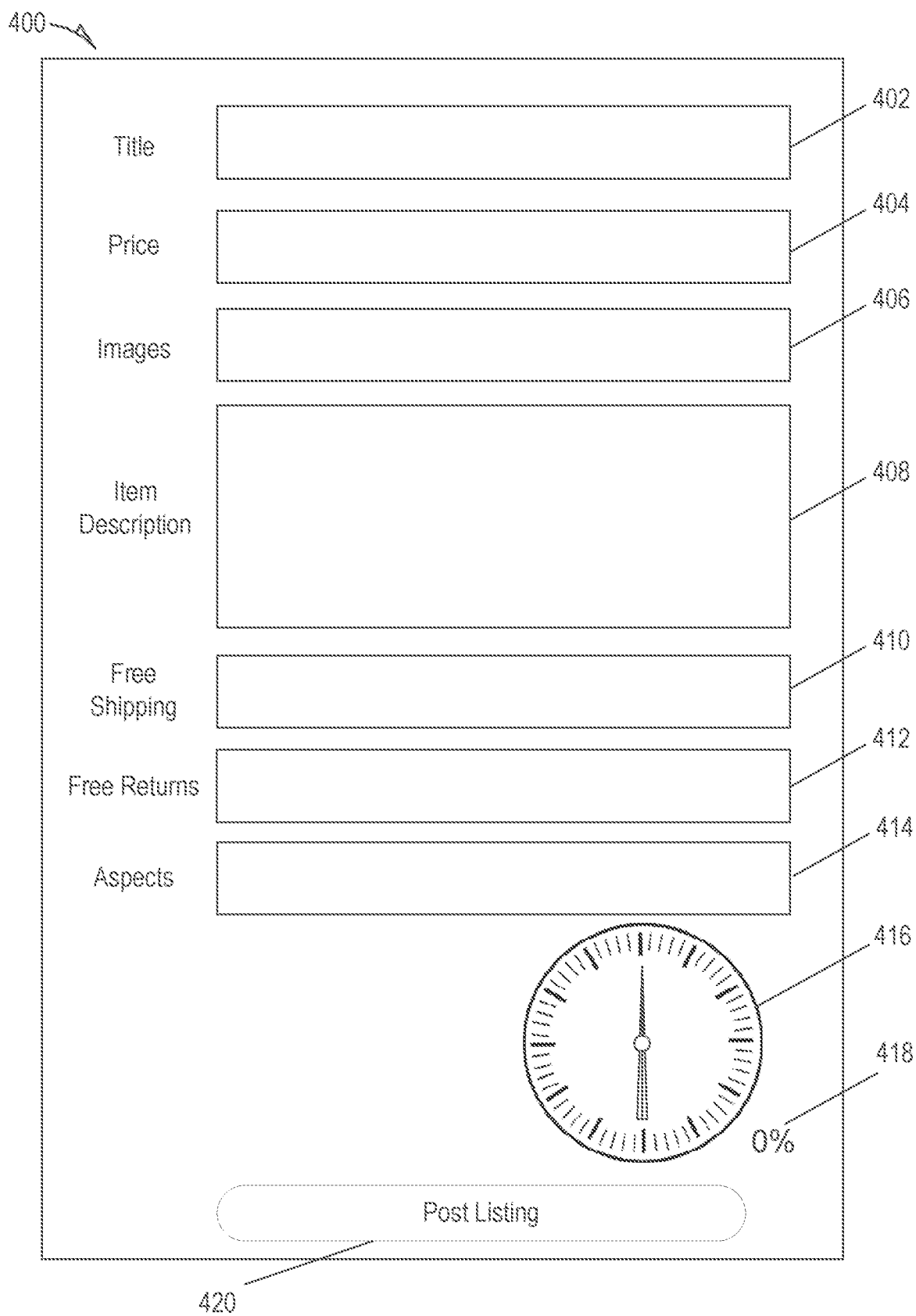

FIGS. 4A-4H show examples of a listing interface 400 providing listing conversion estimation and optimization, according to some example embodiments. As shown in FIG. 4A, the listing interface 400 allows users to enter listing data to generate a new listing to be posted to an online marketplace. For example, the listing interface includes a title input field 402, a price input field 404, an images input field 406, an item description input field 408, a shipping configuration field 410, a return configuration field 412, and an aspect selection field 414, that a user may use to provide listing data to generate the new listing. For example, the user may use the title input field 402 to enter a listing title for the new listing, the price input field 404 to enter a price for the listing, the images input field 406 to provide images for the listing, the item description field 408 to enter an item description for the listing, the shipping configuration field 410 to configure whether shipping will be included in the sale price, the return configuration field 412 to configure whether returns will be free or paid, and the aspect selection field to select one or more aspects labels describing the listed item.

An aspect label may be a structured name value that is selectable by a user to describe and/or categorize the item offered by the listing. For example, a user may select from sets of aspect labels in different categories to describe the listed item, such as by selecting from a set of aspect labels identifying compatible brands, included features, item type, item condition, etc. The selected aspect labels can be used to provide search results to search queries entered by users of the online marketplace Accordingly, inclusion of aspect labels in a listing may result in an increase in the number of search results in which the listing appears, as well as an increase of the positioning of the listing within the search results. As a result, the listing may be seen by a greater number of interested user, resulting in a corresponding increase in the likelihood that the listing will result in a conversion.

The listing interface 400 further includes a post listing button 420, which enables a user to post the listing to the online marketplace based on the listing data provided in the various fields of the listing interface 400. For example, a user that has completed entering listing data may simply actuate (e.g., click) the post listing button 420 to cause the new listing to be posted to the online marketplace.

The listing interface 400 also includes a graphical indicator 416 that provides a graphical representation of how likely the listing is to result in a conversion based on the listing data entered into the fields of the listing interface 400. For example, the graphical indicator 416 represent a likelihood value calculated based on the listing data entered into the fields of the listing interface 400. The likelihood value represented an estimated likelihood that the listing will result in a conversion within a given time frame, such as within a week, two weeks, etc. As shown, the graphical indicator is a graphical representation of a dial that includes a needle that is positioned within the dial to indicate the likelihood value. A numerical representation 418 of the likelihood value is presented next to the graphical indicator 416. A user can use the graphical indicator 416 and/or the numerical representation 418 to quickly and easily determine the likelihood that the listing will result in a conversion given the listing data that has been entered. As shown, listing data has not been entered into any of the fields of the listing interface 400 shown in FIG. 4A. Accordingly the graphical indicator 416 and numerical representation 418 indicate that the likelihood that the listing will result in a conversion is at 0%.

Figure 4B:
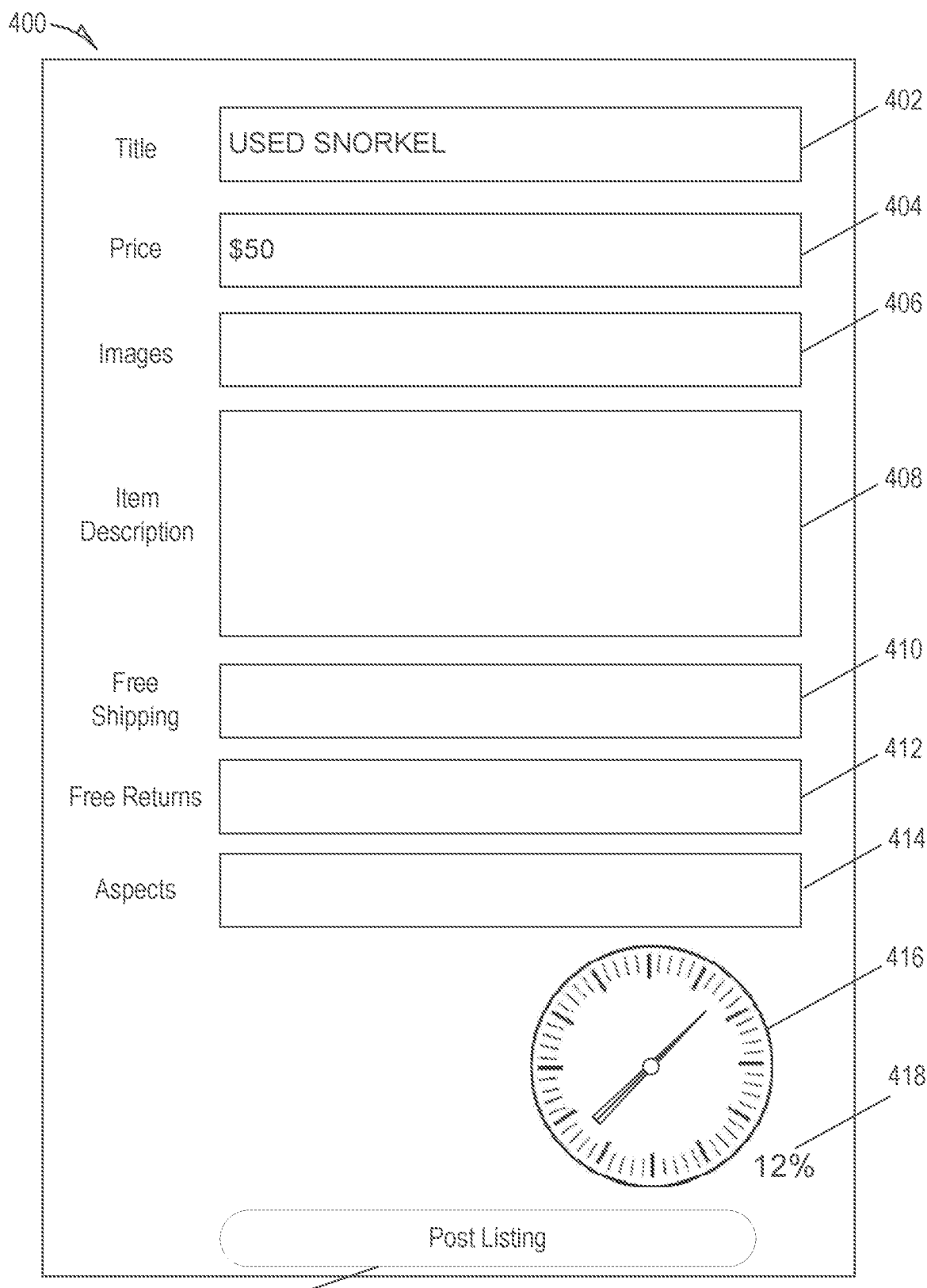

FIG. 4B shows the listing interface 400 as a result of a user entering listing data into some of the data fields of the listing interface 400 shown in FIG. 4A. As shown, the user has entered the listing title "Used Snorkel" into the title input field 402 and the price of $50 into the price input filed 404. As a result of the added listing data, the likelihood that the listing will result in a conversion has increased from the listing interface 400 shown in FIG. 4A. This is represented by the change in the position of the needle shown in the graphical indicator 416 as well as the change to the numerical representation 418, which indicates that the listing has a 12% chance of resulting in a conversion if posted based on the entered listing data (e.g., listing title and listing price). A user that is satisfied with the likelihood that the listing will result in a conversion may select to post the listing by actuating the post listing button 420. Alternatively, a user that is not satisfied with the likelihood that the listing will result in a conversion (e.g., the user prefers a higher likelihood value) may use the listing interface 400 to update the listing by adding additional listing data, modifying the existing listing data, and/or deleting listing data.

Figure 4C:
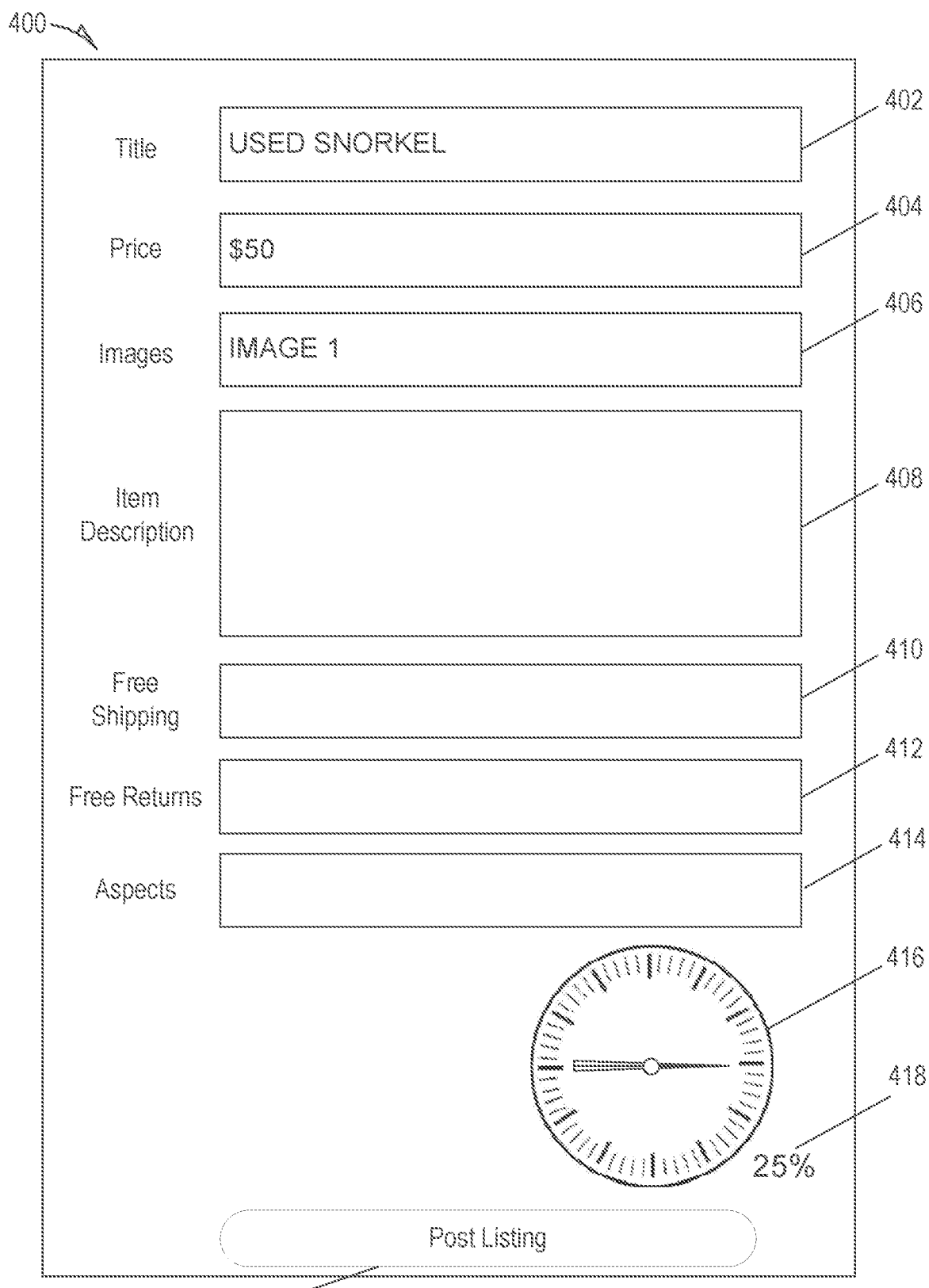

FIG. 4C shows the listing interface 400 as a result of a user modifying the listing interface shown in FIG. 4B by adding additional listing data. As shown, the user has added "IMAGE 1" to the image input field 406. This may include an image file that the user has uploaded for inclusion in the listing, such as an image of the item being offered for sale by the listing. As a result of the added listing data (e.g., IMAGE 1), the likelihood that the listing resulting in a conversion has increased from the listing interface 400 shown in FIG. 4B. This is represented by a change in the position of the needle shown in the graphical indicator 416 as well as the change to the numerical representation 418, which indicates that the listing has a 25% chance of resulting in a conversion if posted based on the entered listing data (e.g., listing title, listing price, and listing image). A user that is satisfied with the likelihood that the listing will result in a conversion may select to post the listing by actuating the post listing button 420. Alternatively, a user that is not satisfied with the likelihood that the listing will result in a conversion (e.g., the user prefers a higher likelihood value) may use the listing interface 400 to update the listing by adding additional listing data, modifying the existing listing data, and/or deleting listing data.

Figure 4D:
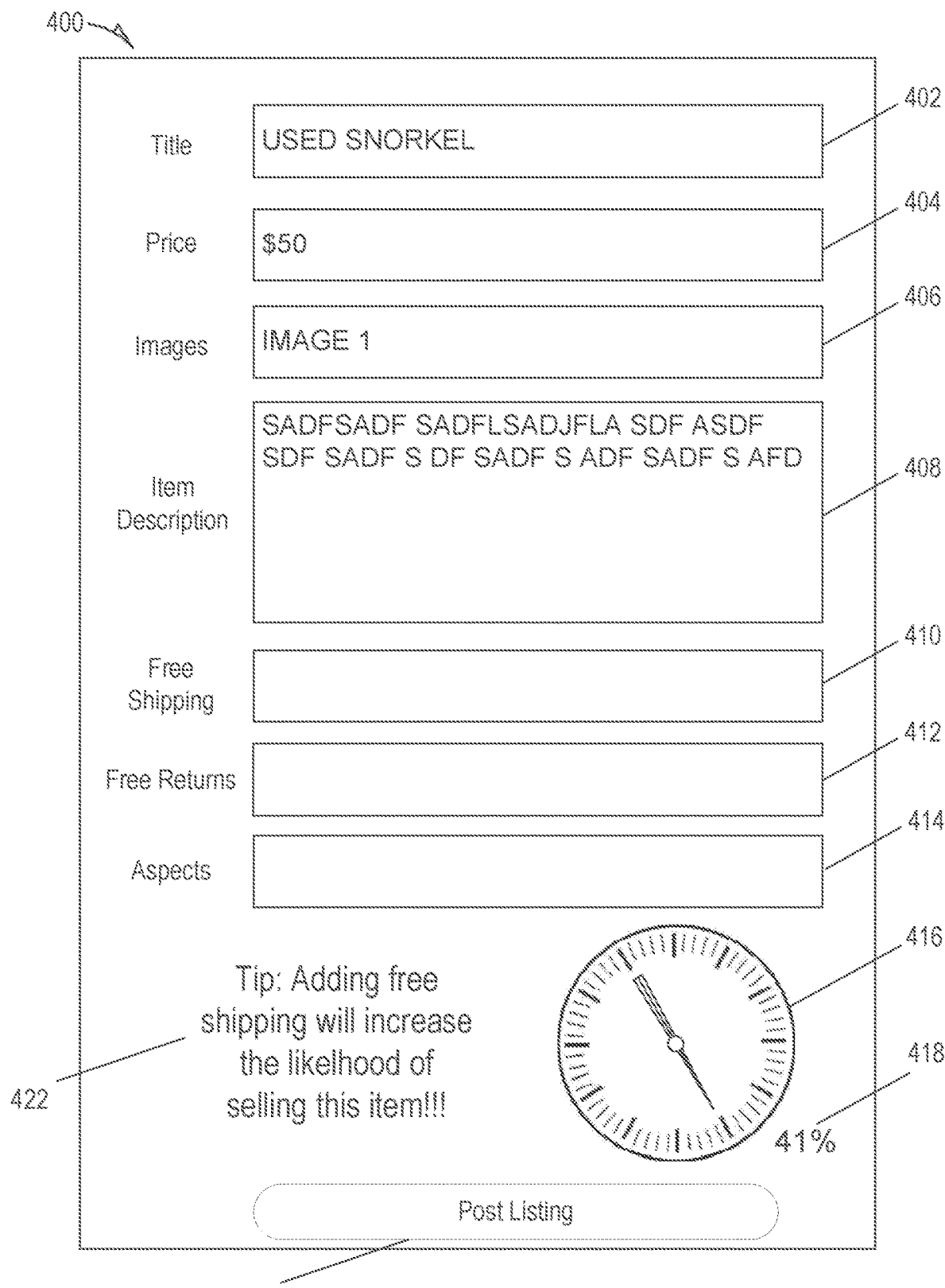

FIG. 4D shows the listing interface 400 as a result of a user modifying the listing interface shown in FIG. 4C by adding additional listing data. As shown, the user has added an item description to the item description field 408. This item description may include text describing the item being offered for sale by the listing. As a result of the added listing data (e.g., the item description), the likelihood that the listing will result in a conversion has increased from the listing interface 400 shown in FIG. 4C. This is represented by a change in the position of the needle shown in the graphical indicator 416 as well as the change to the numerical representation 418, which indicates that the listing now has a 41% chance of resulting in a conversion if posted based on the entered listing data (e.g., listing title, listing price, listing image, and listing description). A user that is satisfied with the likelihood that the listing will result in a conversion may select to post the listing by actuating the post listing button 420. Alternatively, a user that is not satisfied with the likelihood that the listing will result in a conversion (e.g., the user prefers a higher likelihood value) may use the listing interface 400 to update the listing by adding additional listing data, modifying the existing listing data, and/or deleting listing data.

As explained earlier, some users may be uncertain of how to increase the likelihood that their listing will result in a conversion. For example, a user may be uncertain of what changes to make to the listing data, what listing data to add, etc. As shown, the listing interface 400 includes a recommended modification 422 that provides the user with guidance on increasing the likelihood of the listing resulting in a conversion. For example, the recommended modification 422 is a text message notifying the user that adding free shipping will increase the likelihood of the listing resulting in a conversion. A user may implement the suggested modification to increase the likelihood of the listing resulting in a conversion.

Figure 4E:
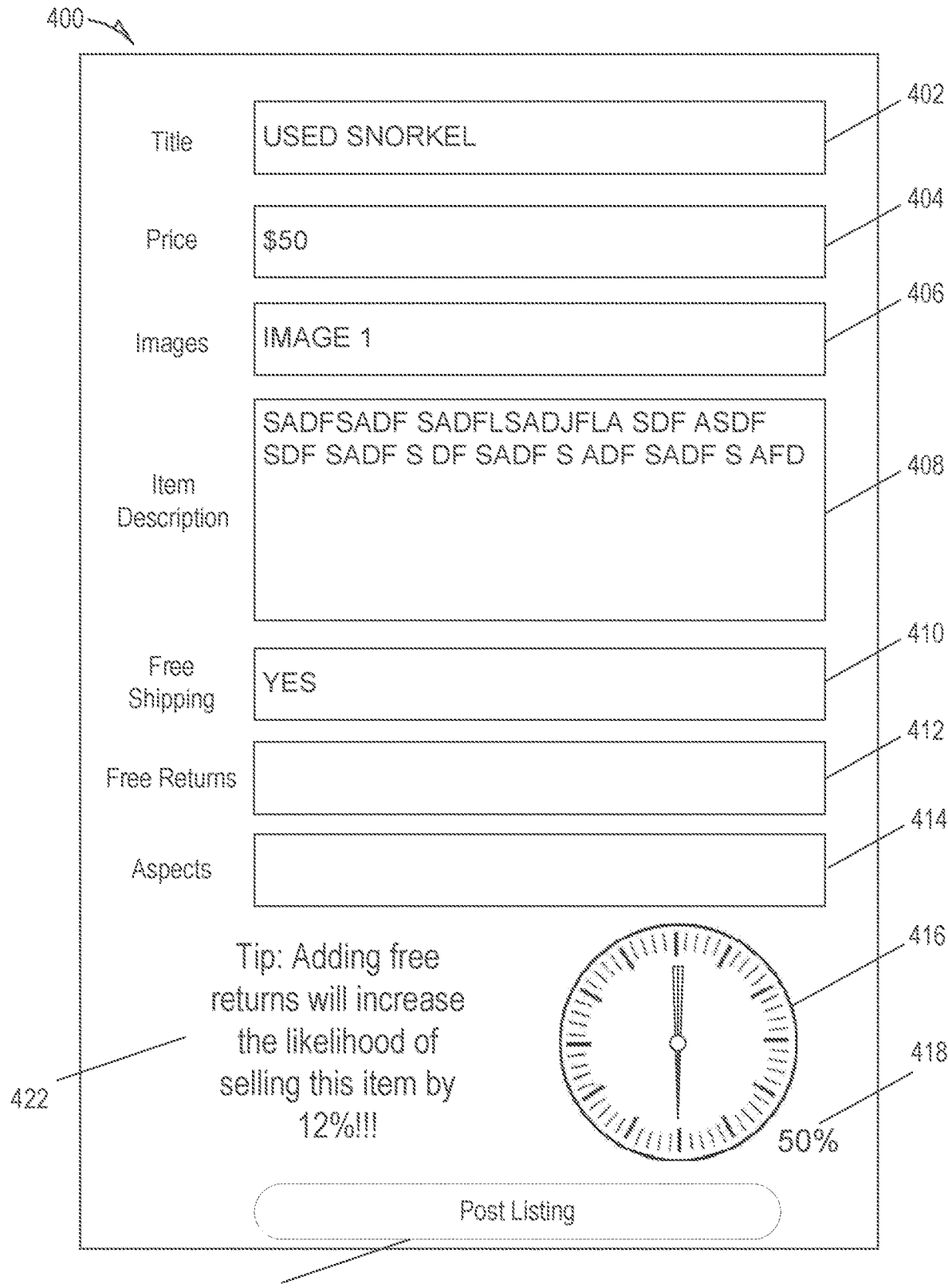

FIG. 4E shows the listing interface 400 as a result of a user modifying the listing interface shown in FIG. 4D by indicating that shipping is provided free (e.g., is included in the listing price). As shown, the user has updated the shipping configuration field 410 to indicate that free shipping is included in the listing. As a result of this update, the likelihood that the listing will result in a conversion has increased from the listing interface 400 shown in FIG. 4D. This is represented by a change in the position of the needle shown in the graphical indicator 416 as well as the change to the numerical representation 418, which indicates that the listing has a 50% chance of resulting in a conversion if posted based on the entered listing data (e.g., listing title, listing price, listing image, item description, and shipping configuration). A user that is satisfied with the likelihood that the listing will result in a conversion may select to post the listing by actuating the post listing button 420. Alternatively, a user that is not satisfied with the likelihood that the listing will result in a conversion (e.g., the user prefers a higher likelihood value) may use the listing interface 400 to update the listing by adding additional listing data, modifying the existing listing data, and/or deleting listing data.

As shown, the listing interface 400 includes another recommended modification 422 that provides the user with guidance on increasing the likelihood of the listing resulting in a conversion. The recommended modification 422 notifies the user that adding free returns will increase the likelihood of the listing resulting in a conversion. Further, unlike the recommended modification 422 presented in FIG. 4D, the recommended modification 422 in FIG. 4E indicates an estimated impact of implementing the modification. For example, the recommended modification 402 indicates that implementing the modification will increase the likelihood that the listing will result in a conversion by an additional 12%. A user may use the estimated impact to determine whether to implement the modification (e.g., determine whether providing free returns is worth the resulting 12% increase to the likelihood that the listing will result in a conversion).

FIG. 4F shows the listing interface 400 as a result of a user modifying the listing interface shown in FIG. 4E by indicating that returns are provided free (e.g., the buyer will not be charged for returning the item). As shown, the user has updated the return configuration field 412 to indicate that free returns are included in the listing. As a result of this update, the likelihood that the listing will result in a conversion has increased from the listing interface 400 shown in FIG. 4E. This is represented by a change in the position of the needle shown in the graphical indicator 416 as well as the change to the numerical representation 418, which indicates that the listing has a 62% chance of resulting in a conversion if posted based on the entered listing data (e.g., listing title, listing price, listing image, item description, shipping configuration, and return configuration). A user that is satisfied with the likelihood that the listing will result in a conversion may select to post the listing by actuating the post listing button 420. Alternatively, a user that is not satisfied with the likelihood that the listing will result in a conversion (e.g., the user prefers a higher likelihood value) may use the listing interface 400 to update the listing by adding additional listing data, modifying the existing listing data, and/or deleting listing data.

As shown, the listing interface 400 includes another recommended modification 422 that provides the user with guidance on increasing the likelihood of the listing resulting in a conversion. The recommended modification 422 notifies the user that both adding aspects, images and a longer description of the item will increase the likelihood of the listing will result in a conversion. A user may select to implement one, both or neither of the recommended modifications.

Figure 4G:
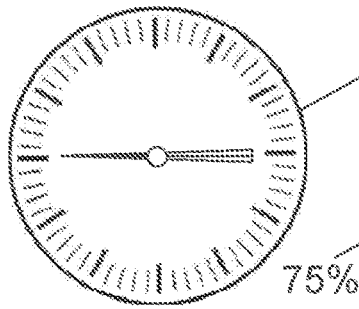

FIG. 4G shows the listing interface 400 as a result of a user modifying the listing interface shown in FIG. 4F by adding additional listing data. As shown, the user has updated the image input field 406 to add two additional images (e.g., IMAGE 2 and IMAGE 3), the item description input field 408 to lengthen the item description, and the aspects data field 414 to add two aspect labels (Full Face, Purge Valve).

As explained earlier, the aspect labels may be selected from a predetermined set of aspect label associated with the item. For example, the online marketplace service 106 may maintain aspect labels for a variety of item types. Accordingly, when a user is generating a listing for a particular item, the online marketplace service 106 may gather the aspect labels corresponding to the item, which may be presented and selected within the listing interface 400. Each aspect label may indicate possible categorization of the item, such as by describing a subset type of the item, features offered by the specific item, compatible products, etc. A user generating the listing may select from the presented aspect labels based on the item being listed. That is, the user may select the presented aspect labels that properly categorize the item being listed.

As shown, the aspect labels added to the aspect selection field 414 include the aspect label Full Face and Purge Valve. The aspect label Full Face describes a subset type of item by indicating the used snorkel being listed is a full-face snorkel. The user may have selected the aspect label Full Face from a set of presented aspect labels including other types of snorkels, such as a classic snorkel, dry snorkel, or flexible snorkel. The aspect label Purge Valve describes a feature provided by the used snorkel being listed. That is, the aspect label indicates that the used snorkel includes a purge valve.

The selected aspect labels are used to provide search results to users of the online marketplace and may increase the likelihood of a listing resulting in a set of search results and/or the position of the search results. As a result, the listing is more likely to be presented to interested users, which also increases the likelihood of the listing resulting in a conversion. For example, the listing is more likely to be presented in response to a user search query such as "used full face snorkel with purge valve."

As a result of these updates, the likelihood that the listing will result in a conversion has increased from the listing interface 400 shown in FIG. 4DF. This is represented by a change in the position of the needle shown in the graphical indicator 416 as well as the change to the numerical representation 418, which indicates that the listing has a 75% chance of resulting in a conversion if posted based on the entered listing data (e.g., listing title, listing price, listing images, item description, and shipping configuration). A user that is satisfied with the likelihood that the listing will result in a conversion may select to post the listing by actuating the post listing button 420. Alternatively, a user that is not satisfied with the likelihood that the listing will result in a conversion (e.g., the user prefers a higher likelihood value) may use the listing interface 400 to update the listing by adding additional listing data, modifying the existing listing data, and/or deleting listing data.

As shown, the listing interface 400 includes another recommended modification 422 that provides the user with guidance on increasing the likelihood of the listing resulting in a conversion. The recommended modification 422 notifies the user that reducing the listing price to $40 will increase the likelihood of the listing resulting in a conversion within the next week to 95%. A user may use the estimated impact to determine whether to implement the modification (e.g., determine whether lowering the cost to $40 is worth the resulting 20% increase to the likelihood that the listing will result in a conversion).

FIG. 4H shows the listing interface 400 as a result of a user modifying the listing interface shown in FIG. 4G by modifying the previous listing data. As shown, the user has updated the listing price field 404 to reduce the listing price to $40. As a result of this update, the likelihood that the listing will result in a conversion has increased from the listing interface 400 shown in FIG. 4G. This is represented by a change in the position of the needle shown in the graphical indicator 416 as well as the change to the numerical representation 418, which indicates that the listing has a 95% chance of resulting in a conversion if posted based on the entered listing data (e.g., listing title, listing price, listing image, item description, and shipping configuration). A user that is satisfied with the likelihood that the listing will result in a conversion may select to post the listing by actuating the post listing button 420. Alternatively, a user that is not satisfied with the likelihood that the listing will result in a conversion (e.g., the user prefers a higher likelihood value) may use the listing interface 400 to update the listing by adding additional listing data, modifying the existing listing data, and/or deleting listing data.

As shown, the listing interface 400 includes another recommended modification 422 that does not include a recommended change to the listing data, but rather notifies the user of the likelihood of the listing resulting in a conversion based on different time periods. For example, the recommended modification 422 notifies the user that the listing has a 95% chance of resulting in a conversion over the next week and a 98% chance of resulting in a conversion over the next two weeks.

Figure 5:
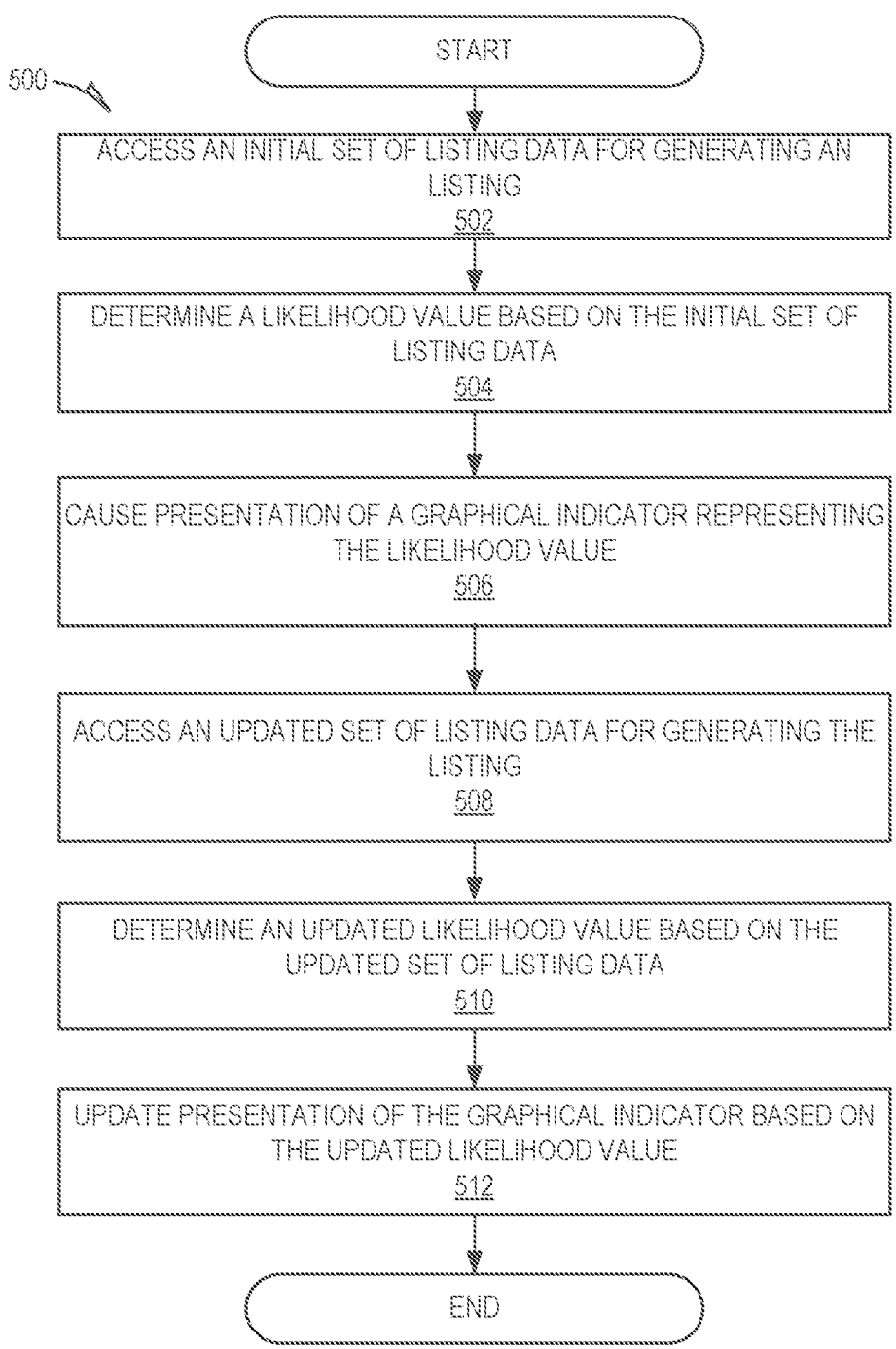
FIG. 5 is a flowchart showing a method of providing listing conversion estimation, according to some example embodiments.

FIG. 5 is a flowchart showing a method 500 of providing listing conversion estimation, according to some example embodiments. The method 500 may be embodied in computer readable instructions for execution by one or more processors such that the operations of the method 500 may be performed in part or in whole by the listing conversion and estimation system 108; accordingly, the method 500 is described below by way of example with reference thereto. However, it shall be appreciated that at least some of the operations of the method 500 may be deployed on various other hardware configurations and the method 500 is not intended to be limited to the listing conversion and estimation system 108.

At operation 502, the listing data accessing module 202 accesses an initial set of listing data for generating a listing. The listing data may be listing data entered by a user as the user is in the process of generating a new listing. For example, the user may be entering listing data into data fields of a listing interface. The listing data accessing module 202 may access this listing data, either from an online service 106 facilitating the listing interface and/or from a data storage 212 in which the listing data is saved.

At operation 504, the likelihood value determination module 204 determines a likelihood value based on the initial set of listing data. The likelihood value indicates a likelihood that the listing will result in a conversion within a given time period based on the initial set of listing data provided by the user. For example, the likelihood value determination module 204 may use the initial set of listing data as input into a set of machine learning models trained based on historical listing data. The set of machine learning models output the likelihood value based on the given input.

At operation 506, the output module 210 causes presentation of a graphical indicator representing the likelihood value. The graphical indicator is a graphical representation of the likelihood value, such as a graphical dial or gauge. For example, the graphical dial may include a needle positioned to represent the likelihood value. The graphical indicator may be generated by a graphical indicator generation module 206 and provided to the output module 210, which causes presentation of the graphical indicator to the user generating the listing. For example, the output module 210 provides data to the online service 106 and/or the client device 102 to cause the graphical indicator to be presented within the listing interface being used by the user to generate the new listing. The presented graphical indicator quickly notifies the user of the likelihood that the listing will result in a conversion based on the provided listing data. A user may use this information to determine whether to post the listing as is or continue to modify the listing to increase the likelihood that the listing will result in a conversion.

The listing conversion estimation and optimization system 108 may update the graphical indicator in real-time or near real-time. Accordingly, at operation 508, the listing data accessing module 202 accesses an updated set of listing data for generating the listing. The updated set of listing data may include additional listing data provided by the user, modifications to the initial set of listing data, and/or removal of listing data.

At operation 510, the likelihood value determination module 204 determines an updated likelihood value based on the updated set of listing data. The updated likelihood value indicates an updated likelihood of the listing resulting in a conversion as a result of the updates the user made to the listing data.

At operation 512, the output module 210 updates presentation of the graphical indicator based on the updated likelihood value. Accordingly, a user is presented with a likelihood value that reflects the likelihood of the listing resulting in a conversion as the user performs updates to the listing.

Figure 6:
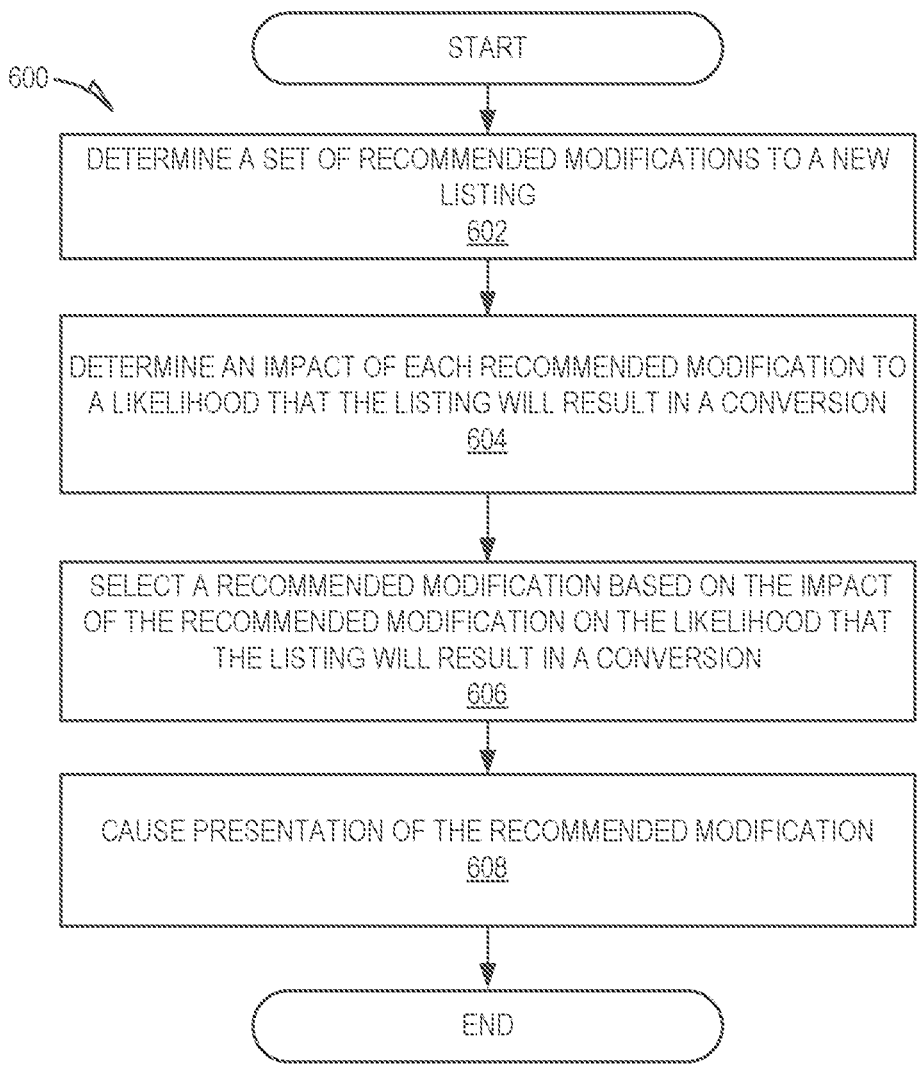
FIG. 6 is a flowchart showing a method of providing listing conversion optimization, according to some example embodiments.

FIG. 6 is a flowchart showing a method 600 of providing listing conversion optimization, according to some example embodiments. The method 600 may be embodied in computer readable instructions for execution by one or more processors such that the operations of the method 600 may be performed in part or in whole by the listing conversion and estimation system 108; accordingly, the method 600 is described below by way of example with reference thereto. However, it shall be appreciated that at least some of the operations of the method 600 may be deployed on various other hardware configurations and the method 600 is not intended to be limited to the listing conversion and estimation system 108.

At operation 602, the recommendation generation module 208 determines a set of potential modifications to a new listing. The set of potential modifications may be a predetermined set of modification that can be made to a listing, such as modifying certain listing data, adding certain listing data, removing certain listing data, etc. The set of potential modifications may be related to a set of model features used to generate a likelihood score for a listing. For example, a machine learning model may generate the likelihood score based on a variety of model features, such as item description length, price, image quality, etc. Each potential modification may be tied to one of the model features to cause a change to the feature provided to the machine learning model when generating a likelihood value.

At operation 604, the recommendation generation module 208 determines an impact of each recommended modification to a likelihood that the listing will result in a conversion.

The machine learning models used to generate the likelihood score may also output data indicating the impact, either negative or positive, of the various model features on the likelihood score. The recommendation generation module 208 may use this data to determine the positive impact of each recommended modification on the likelihood value. For example, the recommendation generation module 208 may identify the model features that had the greatest negative impact on the likelihood value and/or had the largest negative variance from an average or maximum positive impact of the model features. The recommendation generation module 208 may identify the potential positive impact based on the variance. For example, the impact of the recommended may modification may be based on the variance between the current impact of the model feature and the average or maximum positive impact of the model features.

At operation 606, the recommendation generation module 208 selects a recommended modification based on the impact of the recommended modification on the likelihood that the listing will result in a conversion. For example, the recommendation generation module 208 may select the recommend modification determined to have the highest positive impact.

At operation 608, the output module 210 causes presentation of the recommended modification. For example, the output module 210 provides data to the online service 106 and/or the client device 102 to cause text describing the recommended modification to be presented within the listing interface being used by the user to generate the new listing. The recommended modification notifies the user of the modifications the user can make to the listing to increase the likelihood that the listing will result in a conversion.

Software Architecture

Figure 7:
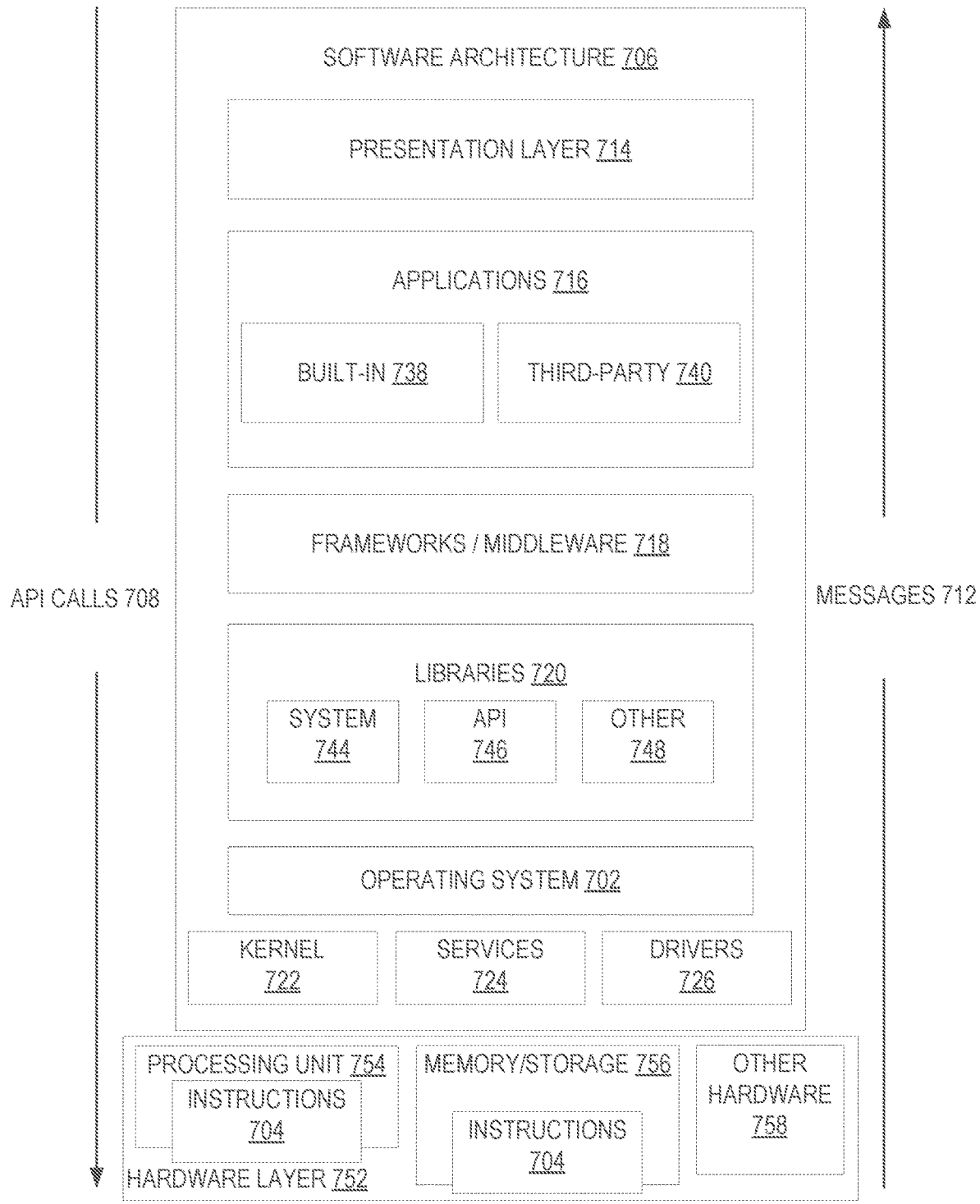
FIG. 7 is a block diagram illustrating a representative software architecture, which may be used in conjunction with various hardware architectures herein described.

FIG. 7 is a block diagram illustrating an example software architecture 706, which may be used in conjunction with various hardware architectures herein described. FIG. 7 is a non-limiting example of a software architecture 706 and it will be appreciated that many other architectures may be implemented to facilitate the functionality described herein. The software architecture 706 may execute on hardware such as machine 800 of FIG. 8 that includes, among other things, processors 804, memory 814, and (input/output) I/O components 818. A representative hardware layer 752 is illustrated and can represent, for example, the machine 800 of FIG. 8. The representative hardware layer 752 includes a processing unit 754 having associated executable instructions 704. Executable instructions 704 represent the executable instructions of the software architecture 706, including implementation of the methods, components, and so forth described herein. The hardware layer 752 also includes memory and/or storage modules 756, which also have executable instructions 704. The hardware layer 752 may also comprise other hardware 758.

In the example architecture of FIG. 7, the software architecture 706 may be conceptualized as a stack of layers where each layer provides particular functionality. For example, the software architecture 706 may include layers such as an operating system 702, libraries 720, frameworks/middleware 718, applications 716, and a presentation layer 714. Operationally, the applications 716 and/or other components within the layers may invoke Application Programming Interface (API) calls 708 through the software stack and receive a response such as messages 712 in response to the API calls 708. The layers illustrated are representative in nature and not all software architectures have all layers. For example, some mobile or special purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 720 provide a common infrastructure that is used by the applications 716 and/or other components and/or layers. The libraries 720 provide functionality that allows other software components to perform tasks in an easier fashion than to interface directly with the underlying operating system 702 functionality (e.g., kernel 722, services 724, and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 (also sometimes referred to as middleware) provide a higher-level common infrastructure that may be used by the applications 716 and/or other software components/modules. For example, the frameworks/middleware 718 may provide various graphical user interface (GUI) functions, high-level resource management, high-level location services, and so forth. The frameworks/middleware 718 may provide a broad spectrum of other APIs that may be used by the applications 716 and/or other software components/modules, some of which may be specific to a particular operating system 702 or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. Third-party applications 740 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 740 may invoke the API calls 708 provided by the mobile operating system (such as operating system 702) to facilitate functionality described herein.

The applications 716 may use built in operating system functions (e.g., kernel 722, services 724, and/or drivers 726), libraries 720, and frameworks/middleware 718 to create UIs to interact with users of the system. Alternatively, or additionally, in some systems, interactions with a user may occur through a presentation layer, such as presentation layer 714. In these systems, the application/component "logic" can be separated from the aspects of the application/component that interact with a user.

Figure 8:
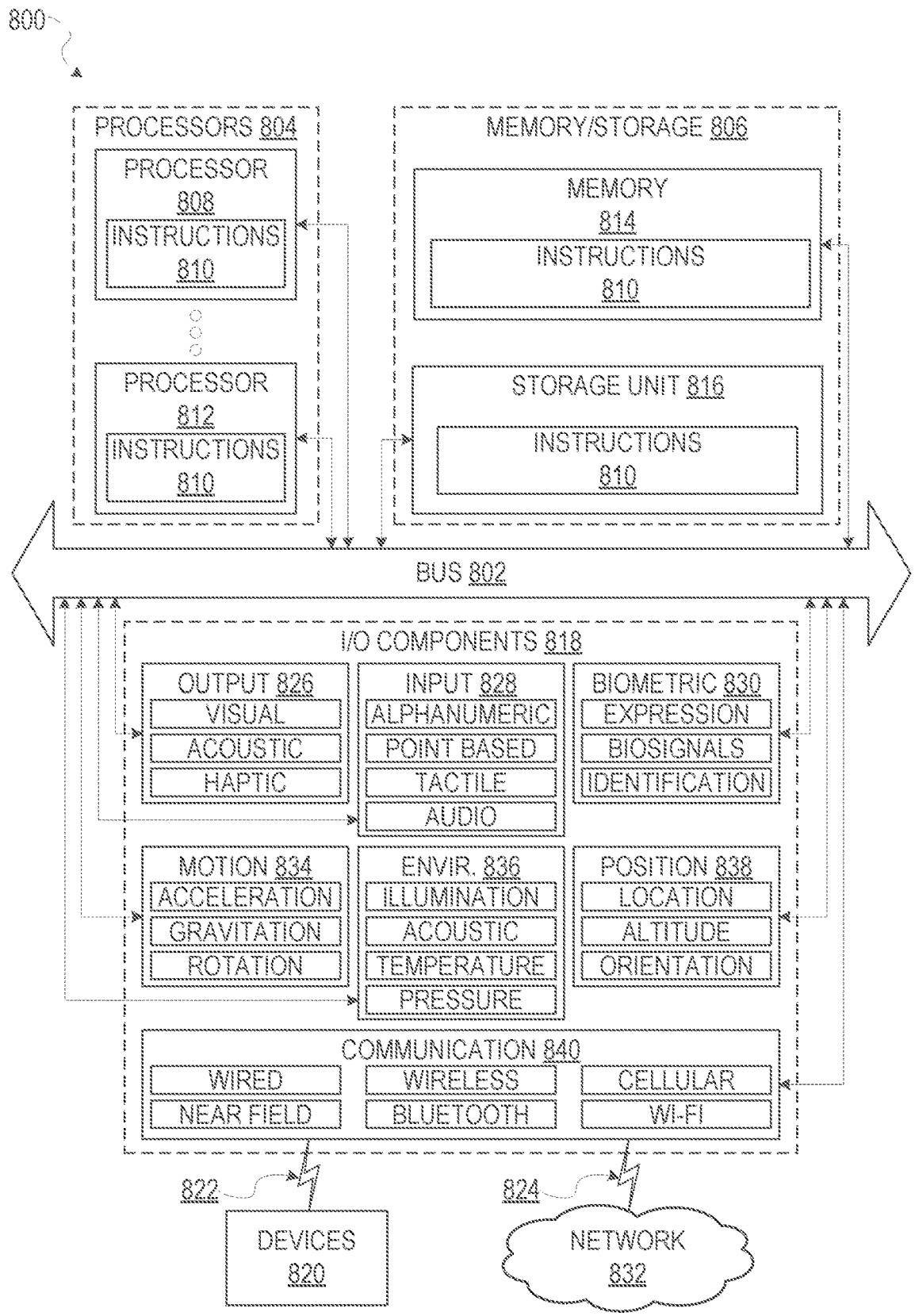
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions 704 from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 800 capable of executing the instructions 810, sequentially or otherwise, that specify actions to be taken by machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, memory/storage 806, and I/O components 818, which may be configured to communicate with each other such as via a bus 802. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of processors 804 are examples of machine-readable media.

The I/O components 818 may include a wide variety of components to receive input, provide output, produce output, transmit information, exchange information, capture measurements, and so on. The specific I/O components 818 that are included in a particular machine 800 will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion and the grouping is in no way limiting. In various example embodiments, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 818 may include biometric components 830, motion components 834, environmental components 836, or position components 838 among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 834 may include acceleration sensor components (e.g., accelerometer), gravitation sensor components, rotation sensor components (e.g., gyroscope), and so forth. The environmental components 836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 838 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 832 or devices 820 via coupling 824 and coupling 822, respectively. For example, the communication components 840 may include a network interface component or other suitable device to interface with the network 832. In further examples, communication components 840 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 810 for execution by the machine 800, and includes digital or analog communications signals or other intangible medium to facilitate communication of such instructions 810. Instructions 810 may be transmitted or received over the network 832 using a transmission medium via a network interface device and using any one of a number of well-known transfer protocols.

"CLIENT DEVICE" in this context refers to any machine 800 that interfaces to a communications network 832 to obtain resources from one or more server systems or other client devices. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 832.

"COMMUNICATIONS NETWORK" in this context refers to one or more portions of a network 832 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 832 or a portion of a network 832 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 810 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 810. The term "machine-readable medium" shall also be taken to include any medium, or combination of multiple media, that is capable of storing instructions 810 (e.g., code) for execution by a machine 800, such that the instructions 810, when executed by one or more processors 804 of the machine 800, cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 804) may be configured by software (e.g., an application 716 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 804 or other programmable processor 804. Once configured by such software, hardware components become specific machines 800 (or specific components of a machine 800) uniquely tailored to perform the configured functions and are no longer general-purpose processors 804. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 804 configured by software to become a special-purpose processor, the general-purpose processor 804 may be configured as respectively different special-purpose processors (e.g., comprising different hardware components) at different times. Software accordingly configures a particular processor or processors 804, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 802) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 804 that are temporarily configured (e.g., by software) or permanently configured to perform the relevant operations. Whether temporarily or permanently configured, such processors 804 may constitute processor-implemented components that operate to perform one or more operations or functions described herein. As used herein, "processor-implemented component" refers to a hardware component implemented using one or more processors 804. Similarly, the methods described herein may be at least partially processor-implemented, with a particular processor or processors 804 being an example of hardware. For example, at least some of the operations of a method may be performed by one or more processors 804 or processor-implemented components. Moreover, the one or more processors 804 may also operate to support performance of the relevant operations in a "cloud computing" environment or as a "software as a service" (SaaS). For example, at least some of the operations may be performed by a group of computers (as examples of machines 800 including processors 804), with these operations being accessible via a network 832 (e.g., the Internet) and via one or more appropriate interfaces (e.g., an API). The performance of certain of the operations may be distributed among the processors 804, not only residing within a single machine 800, but deployed across a number of machines 800. In some example embodiments, the processors 804 or processor-implemented components may be located in a single geographic location (e.g., within a home environment, an office environment, or a server farm). In other example embodiments, the processors 804 or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine 800. A processor 804 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor may further be a multi-core processor having two or more independent processors 804 (sometimes referred to as "cores") that may execute instructions 810 contemporaneously.

What is claimed is:

1. A method, comprising:

receiving, from a client device, a first set of listing data for generating a listing of an item for sale on an online marketplace;

generating an input based on the first set of listing data;

providing the input to a machine learning model trained based on historical listing data associated with previous listings posted to the online marketplace, the machine learning model outputting a first likelihood value based on the input, the first likelihood value indicating a likelihood that the listing will result in a sale within a given time period;

causing presentation of a graphical indicator on a display of the client device based on the first likelihood value, the graphical indicator representing the likelihood that the listing will result in the sale within the given time period;

determining, based on the first set of listing data, a recommended modification to be performed to the listing of the item for sale;

determining an expected change to the first likelihood value resulting from performance of the recommended modification;

causing presentation of a notification on the display of the client device, the notification identifying the recommended modification and the expected change to the first likelihood value resulting from performance of the recommended modification;

performing the recommended modification; and adjusting the graphical indicator based on performing the recommended modification.

2. The method of claim 1, further comprising:
after causing presentation of the graphical indicator, receiving, from the client device, a second set of listing data for generating the listing;
determining, based on the first set of listing data and the second set of listing data, an updated likelihood value indicating the likelihood that the listing will result in a sale within a given time period; and
updating presentation of the graphical indicator on the display of the client device to representing the updated likelihood value.

3. The method of claim 1, wherein the graphical indicator is a graphical representation of a dial indicator, the dial indicator including a hand positioned within the dial indicator to represent the first likelihood value.

4. The method of claim 1, wherein the graphical indicator is a two-dimensional chart, the two-dimensional chart including a first axis representing the first likelihood value and a second axis representing the first time period, the first likelihood value being a function of the first time period.

5. The method of claim 1, wherein the first set of listing data including values for at least two listing data fields.

6. The method of claim 5, wherein the at least two listing data fields includes images of the item listed for sale.

7. A system comprising:
one or more computer processors; and
one or more computer-readable mediums storing instructions that, when executed by the one or more computer processors, cause the system to perform operations comprising:
receiving, from a client device, a first set of listing data for generating a listing of an item for sale on an online marketplace;
generating an input based on the first set of listing data;
providing the input to a machine learning model trained based on historical listing data associated with previous listings posted to the online marketplace, the machine learning model outputting a first likelihood value based on the input, the first likelihood value indicating a likelihood that the listing will result in a sale within a given time period;
causing presentation of a graphical indicator on a display of the client device based on the first likelihood value, the graphical indicator representing the likelihood that the listing will result in the sale within the given time period;
determining, based on the first set of listing data, a recommended modification to be performed to the listing of the item for sale;
determining an expected change to the first likelihood value resulting from performance of the recommended modification;
causing presentation of a notification on the display of the client device, the notification identifying the recommended modification and the expected change to the first likelihood value resulting from performance of the recommended modification;
performing the recommended modification; and adjusting the graphical indicator based on performing the recommended modification.

8. The system of claim 7, the operations further comprising:
after causing presentation of the graphical indicator, receiving, from the client device, a second set of listing data for generating the listing;
determining, based on the first set of listing data and the second set of listing data, an updated likelihood value indicating the likelihood that the listing will result in a sale within a given time period; and
updating presentation of the graphical indicator on the display of the client device to representing the updated likelihood value.

9. The system of claim 7, wherein the graphical indicator is a graphical representation of a dial indicator, the dial indicator including a hand positioned within the dial indicator to represent the first likelihood value.

10. The system of claim 7, wherein the graphical indicator is a two dimensional chart, the two dimensional chart including a first axis representing the likelihood first value and a second axis representing the first time period, the first likelihood value being a function of the first time period.

11. The system of claim 7, wherein the first set of listing data including values for at least two listing data fields.

12. The system of claim 11, wherein the at least two listing data fields includes images of the item listed for sale.

13. A non-transitory computer-readable medium storing instructions that, when executed by one or more computer processors of one or more computing devices, cause the one or more computing devices to perform operations comprising:
receiving, from a client device, a first set of listing data for generating a listing of an item for sale on an online marketplace;
generating an input based on the first set of listing data;
providing the input to a machine learning model trained based on historical listing data associated with previous listings posted to the online marketplace, the machine learning model outputting a first likelihood value based on the input, the first likelihood value indicating a likelihood that the listing will result in a sale within a given time period;
causing presentation of a graphical indicator on a display of the client device based on the first likelihood value, the graphical indicator representing the likelihood that the listing will result in the sale within the given time period;
determining, based on the first set of listing data, a recommended modification to be performed to the listing of the item for sale;
determining an expected change to the first likelihood value resulting from performance of the recommended modification;
causing presentation of a notification on the display of the client device, the notification identifying the recommended modification and the expected change to the first likelihood value resulting from performance of the recommended modification;
performing the recommended modification; and
adjusting the graphical indicator based on performing the recommended modification.

14. The non-transitory computer-readable medium of claim 13, the operations further comprising:
after causing presentation of the graphical indicator, receiving, from the client device, a second set of listing data for generating the listing;
determining, based on the first set of listing data and the second set of listing data, an updated likelihood value indicating the likelihood that the listing will result in a sale within a given time period; and
updating presentation of the graphical indicator on the display of the client device to representing the updated likelihood value.

15. The non-transitory computer-readable medium of claim 13, wherein the graphical indicator is a graphical representation of a dial indicator, the dial indicator including a hand positioned within the dial indicator to represent the first likelihood value.

16. The non-transitory computer-readable medium of claim 13, wherein the graphical indicator is a two-dimensional chart, the two dimensional chart including a first axis representing the first likelihood value and a second axis representing the first time period, the first likelihood value being a function of the first time period.

17. The non-transitory computer-readable medium of claim 13, wherein the first set of listing data including values for at least two listing data fields.

\* \* \* \* \*